(12) United States Patent
Dhiman et al.

(10) Patent No.: US 11,490,159 B2
(45) Date of Patent: Nov. 1, 2022

(54) METHODS AND SYSTEMS FOR VIEWING MISSED MEDIA CONTENT

(71) Applicant: Rovi Guides, Inc., San Jose, CA (US)

(72) Inventors: Rohit Dhiman, Uttarakhand (IN); Ashish Gupta, Karnataka (IN); Vaibhav Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/107,378

(22) Filed: Nov. 30, 2020

(65) Prior Publication Data

US 2022/0174354 A1 Jun. 2, 2022

(51) Int. Cl.
| | |
|---|---|
| *H04N 21/442* | (2011.01) |
| *H04N 21/2187* | (2011.01) |
| *H04N 21/231* | (2011.01) |
| *H04N 21/437* | (2011.01) |
| *H04N 21/44* | (2011.01) |
| *H04N 21/647* | (2011.01) |

(52) U.S. Cl.
CPC ... *H04N 21/44209* (2013.01); *H04N 21/2187* (2013.01); *H04N 21/231* (2013.01); *H04N 21/437* (2013.01); *H04N 21/44016* (2013.01); *H04N 21/6473* (2013.01)

(58) Field of Classification Search
CPC ......... H04N 21/44209; H04N 21/2187; H04N 21/231; H04N 21/437; H04N 21/44016; H04N 21/6473
See application file for complete search history.

(56) References Cited

U.S. PATENT DOCUMENTS

| | | | | |
|---|---|---|---|---|
| 7,937,728 | B2 * | 5/2011 | Barsness | H04N 9/8042 |
| | | | | 725/58 |
| 9,003,426 | B2 * | 4/2015 | Russello | G06F 21/445 |
| | | | | 719/313 |
| 2002/0197053 | A1 | 12/2002 | Nakamura et al. | |
| 2004/0103372 | A1 * | 5/2004 | Graham | G06F 16/30 |
| | | | | 715/202 |
| 2007/0266414 | A1 * | 11/2007 | Kahn | H04N 21/2541 |
| | | | | 725/113 |

(Continued)

FOREIGN PATENT DOCUMENTS

CN 108924485 A 11/2018

OTHER PUBLICATIONS

PCT International Search Report for International Application No. PCTUS2021060984, dated Mar. 22, 2022 (11 pages).

*Primary Examiner* — Sumaiya A Chowdhury
(74) *Attorney, Agent, or Firm* — Haley Guiliano LLP

(57) ABSTRACT

Systems and methods are described for viewing missed media content. A media content stream is received at a user device. A first timestamp is logged, in response to determining a first failure in the receiving of the content stream, indicating when the first failure in the receiving of the content stream to the user device occurred. A second timestamp is logged, in response to determining a first restoration of the receiving of the content stream, indicating when the first restoration in the receiving of the content stream to the user device occurred. A first recorded portion of the media content stream is retrieved. The first recorded portion has a start point corresponding to the first timestamp and an end point corresponding to the second timestamp.

16 Claims, 8 Drawing Sheets

(56) References Cited

U.S. PATENT DOCUMENTS

| | | |
|---|---|---|
| 2011/0219258 A1 | 9/2011 | Cooper et al. |
| 2011/0300910 A1* | 12/2011 | Choi .................... G06F 3/0482 |
| | | 455/566 |
| 2015/0163532 A1* | 6/2015 | Shmueli ............. H04N 21/2747 |
| | | 386/326 |
| 2016/0035389 A1 | 2/2016 | Boic |
| 2020/0374570 A1 | 11/2020 | Srinivasan et al. |

* cited by examiner

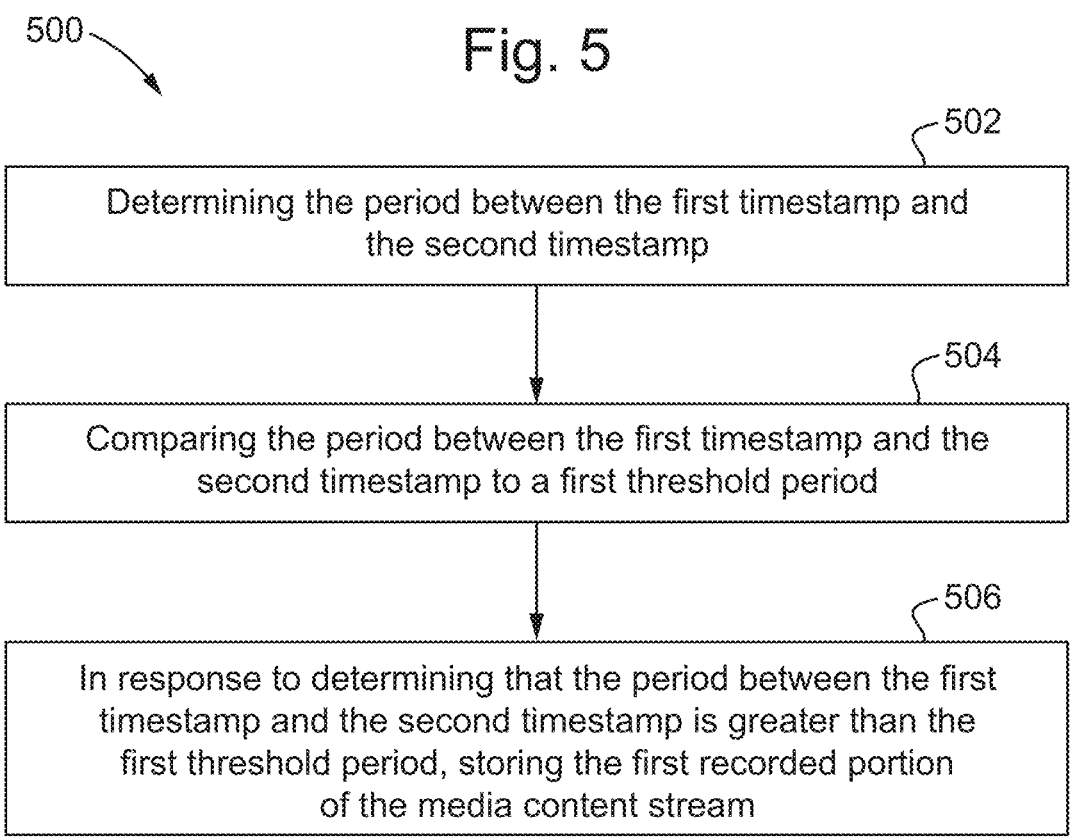

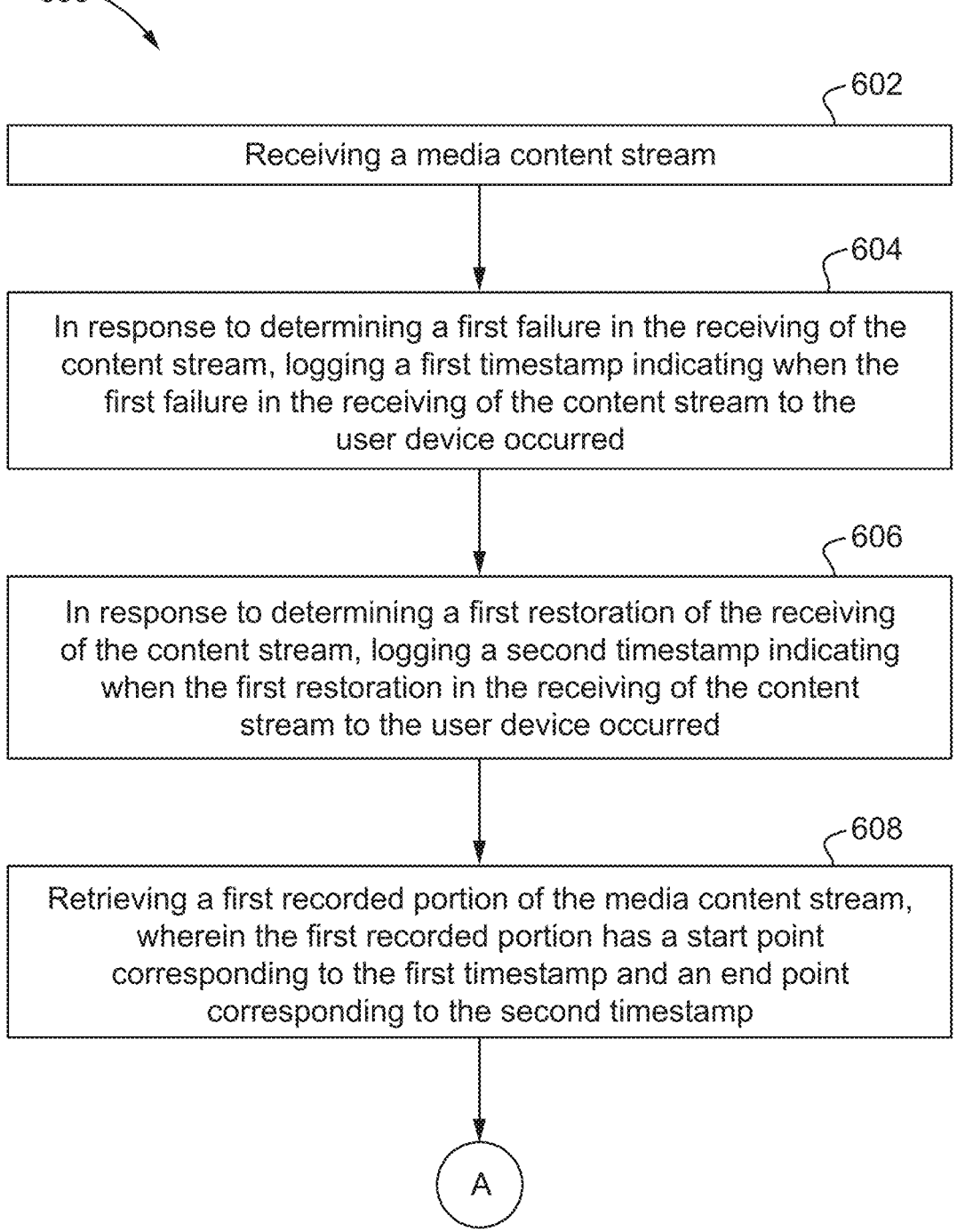

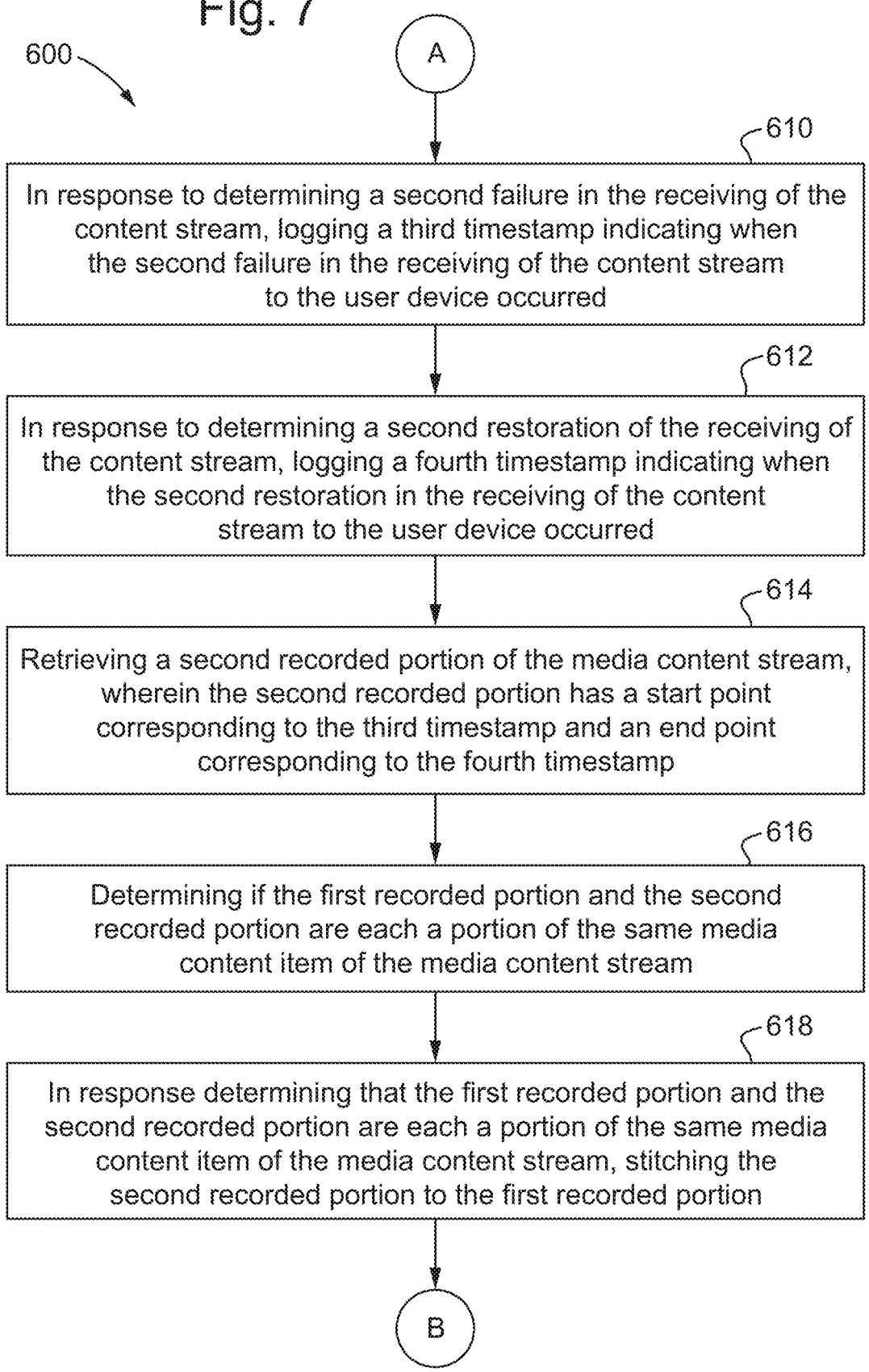

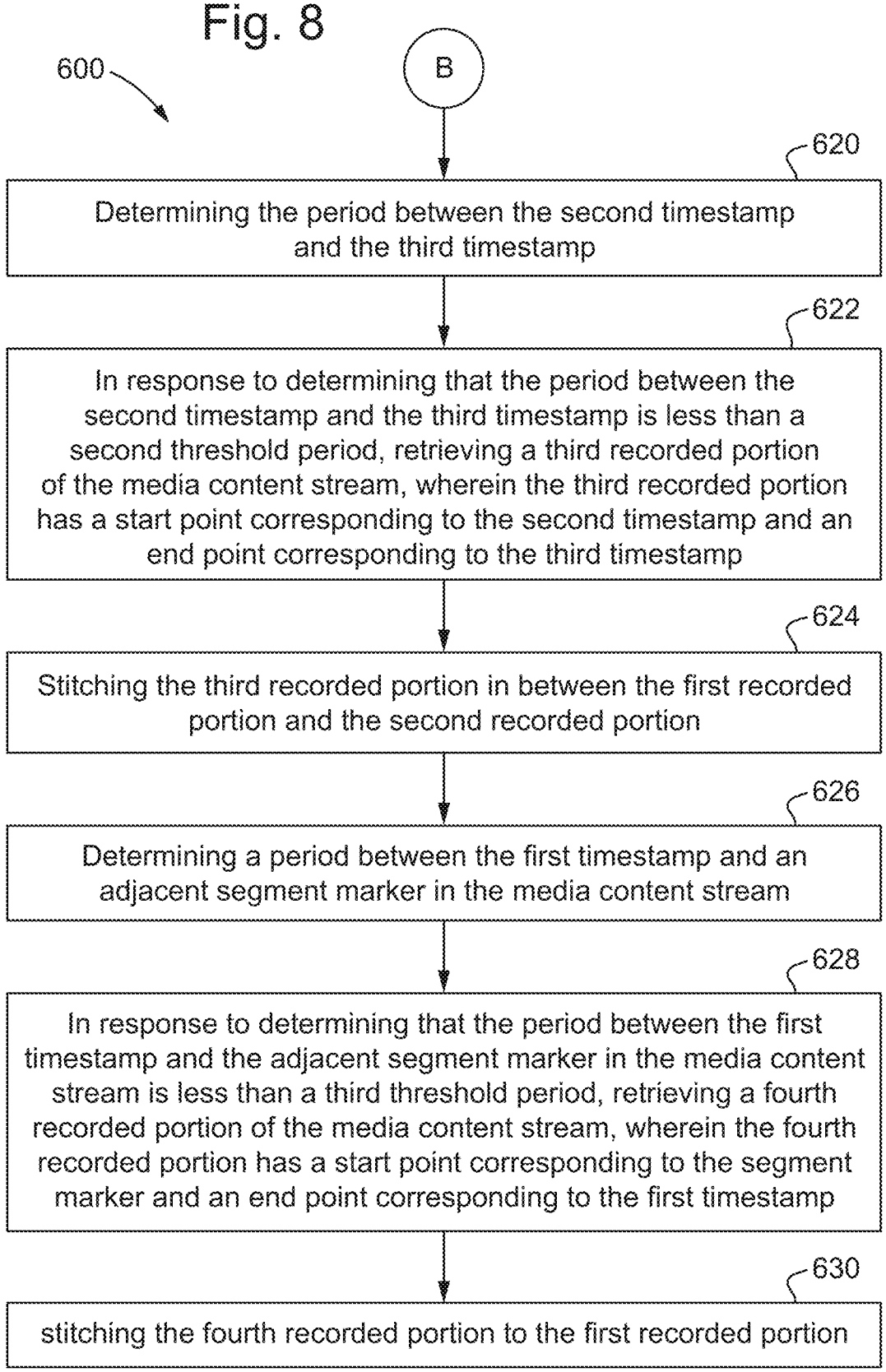

METHODS AND SYSTEMS FOR VIEWING MISSED MEDIA CONTENT

BACKGROUND

The present disclosure relates to methods and systems for viewing missed media content, and in particular, but not exclusively, to stitching together missed portions of media content and automatically providing a user access to the missed portions.

SUMMARY

In recent years, content providers have increasingly provided media content through live streams, e.g., using Internet Protocol Television (IPTV). However, when a user experiences issues with connectivity, such as an intermittent connection and/or low bandwidth, the user may miss a portion of the live-streamed content. Moreover, when issues with connectivity cease to be a problem, the user must continue watching the live stream from the point at which the connection becomes stable and/or bandwidth is restored to a suitable level, therein returning the user to the live stream at a point that may be unrelated to the last viewed portion of the stream. For example, where the user is watching a live football game and connectivity problems are encountered, the user may miss a key portion of play, such as a goal, and be returned to the football game having missed said key portion of play.

Systems and methods are provided herein enabling a user to view missed media content, e.g., as they continue to watch the live stream or at a later point in time.

According to some aspects of the systems and methods provided herein, a media content stream is received at a user device. For example, a service provider may transmit a live media content stream to a user device, e.g., by virtue of Internet Protocol Television. In some examples, a failure, e.g., a first failure, in the receiving of the content stream is determined. The failure in the receiving of the content stream may be any type of failure, e.g., total failure or failure to receive the content stream at a certain quality, for a predetermined amount of time. The failure in the receiving of the content stream may be determined at the user device and/or a network hub, such as a home network hub. In some examples, the service provider transmitting the stream may be unaware of the failure of the user device receiving the content stream. In response to determining the failure in the receiving of the content stream, a first timestamp is logged. The first timestamp indicates when the first failure in the receiving of the content stream to the user device occurred. In some examples, a restoration, e.g., a first restoration, of the receiving of the content stream is determined. The restoration in the receiving of the content stream may be any type of restoration, e.g., total restoration or restoration of receiving the content stream at a certain quality, for a predetermined amount of time. The restoration in the receiving of the content stream may be determined at the user device and/or a network hub, such as a home network hub. In some examples, the service provider transmitting the stream may be unaware of the restoration of the user device receiving the content stream. In response to determining the restoration in the receiving of the content stream, a second timestamp is logged. The second timestamp indicates when the restoration in the receiving of the content stream to the user device occurred. A recorded portion, e.g., a first recorded portion, of the media content stream is retrieved, e.g., from a recording of a live content stream stored by the service provider. The recorded portion has a start point corresponding to the first timestamp and an end point corresponding to the second timestamp.

In some examples, the period between the first timestamp and the second timestamp is determined. In response to determining that the period between the first timestamp and the second timestamp is greater than a first threshold period, the recorded portion of the media content stream is stored for user playback. The recorded portion may be stored on the user device and/or on a server/content database of the service provider.

In some examples, the first threshold period may be predetermined by a user or by a service provider. For example, the user or the service provider may set the minimum or maximum period between a failure and restoration before the retrieval (and storage) of a recorded portion of missed content is initiated. The value for the first threshold period may be stored in a user profile, either on the user device or on a server of the service provider.

In some examples, a second failure in the receiving of the content stream is determined. In response to determining the second failure in the receiving of the content stream, a third timestamp is logged. The third timestamp indicates when the second failure in the receiving of the content stream to the user device occurred.

In some examples, a second restoration in the receiving of the content stream is determined. In response to determining the second restoration of the receiving of the content stream, a fourth timestamp is logged indicating when the second restoration in the receiving of the content stream to the user device occurred.

In some examples, a second recorded portion of the media content stream is retrieved. The second recorded portion may have a start point corresponding to the third timestamp and an end point corresponding to the fourth timestamp.

In some examples, it is determined whether the first recorded portion and the second recorded portion are each a portion of the same media content item of the media content stream.

In some examples, in response to determining that the first recorded portion and the second recorded portion are each a portion of the same media content item of the media content stream, the second recorded portion is stitched (either directly or indirectly) to the first recorded portion.

In some examples, the period between the second timestamp and the third timestamp is determined.

In some examples, in response to determining that the period between the second timestamp and the third timestamp is less than a second threshold period, a third recorded portion of the media content stream is retrieved. The third recorded portion may have a start point corresponding to the second timestamp and an end point corresponding to the third timestamp.

In some examples, the third recorded portion is stitched in between the first recorded portion and the second recorded portion.

In some examples, a period between the first timestamp and an adjacent, e.g., preceding or succeeding, segment marker in the media content stream is determined.

In some examples, in response to determining that the period between the first timestamp and the adjacent segment marker in the media content stream is less than a third threshold period, a fourth recorded portion of the media content stream is retrieved. The fourth recorded portion may have a start point corresponding to the segment marker and an end point corresponding to the first timestamp.

In some examples, the fourth recorded portion is stitched to the first recorded portion.

In some examples, additional media content is stitched to at least one of the first recorded portion and the second recorded portion. The additional media content may not be part of the media content stream.

In some examples, at least one recorded portion of the media content stream is generated, e.g., automatically generated, for playback, e.g., on one or more user devices. The at least one recorded portion of the media content stream that is generated for playback may be displayed as picture-in-picture on the display of a live media content stream. The at least one recorded portion of the media content stream that is generated for playback may be displayed on a user device that is different from the user device on which a live media content stream is displayed.

In some examples, a user selects for playback at least one recorded portion of the media content stream, e.g., on one or more user devices. An application programming interface (API) may be provided, e.g., by the service provider, to allow a user to select for playback at least one missed portion of media content. For example, the API may provide a hyperlink to at least one missed portion of media content.

In some examples, the state of a connection between the user device and the network over which the media content stream is received is monitored. The state of the connection may be monitored by the user device, and/or a network to which the user device is connected.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 is a flowchart representing an illustrative process 500 for optimizing the storage of missed content, in accordance with some examples of the disclosure;

FIG. 6 is a flowchart representing an illustrative process 600 for stitching together multiple portions of missed content, in accordance with some examples of the disclosure;

FIG. 7 is a continuation of the flowchart shown in FIG. 6; and

FIG. 8 is a continuation of the flowchart shown in FIG. 7.

DETAILED DESCRIPTION

Figure 1:
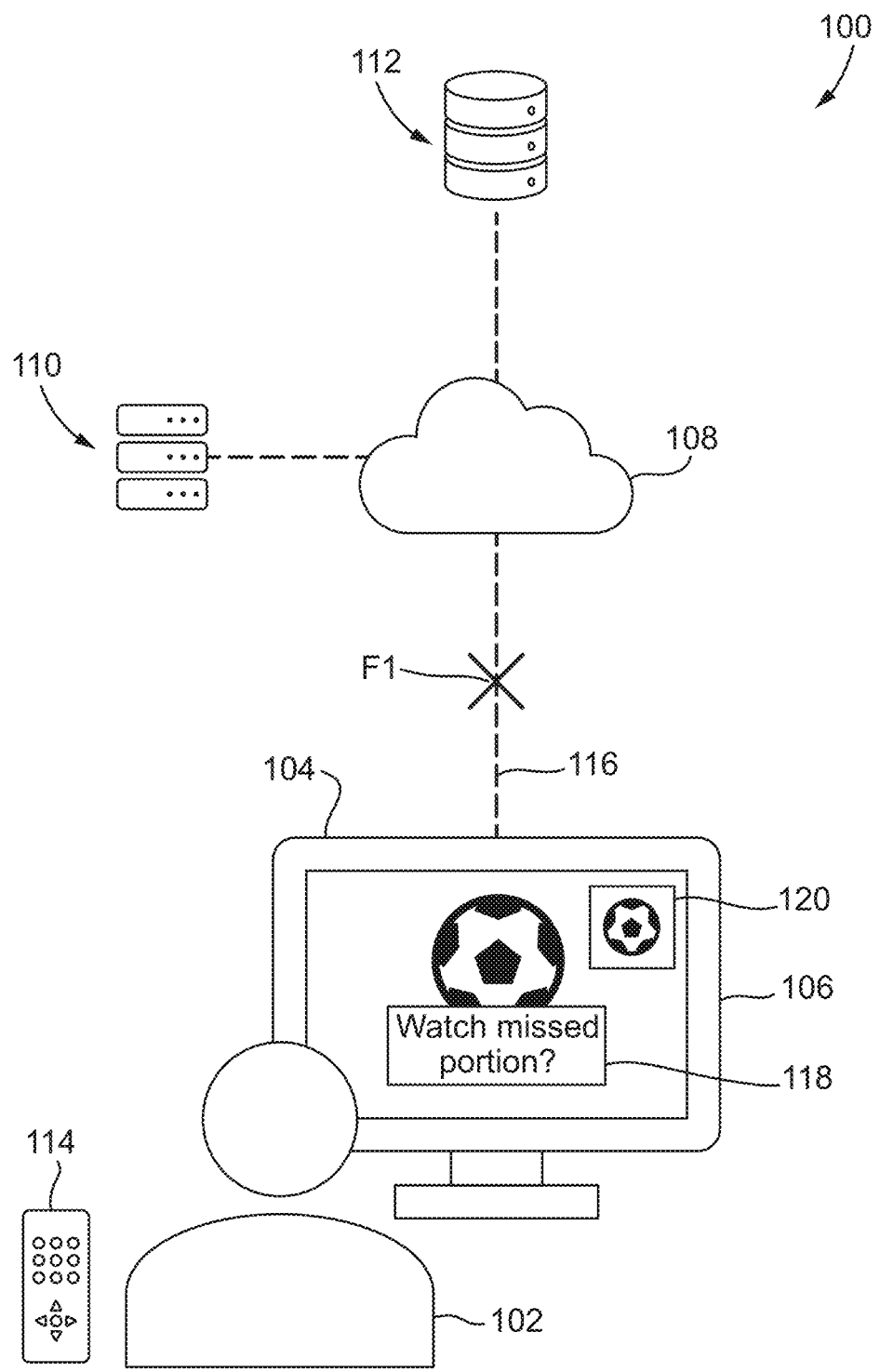
FIG. 1 illustrates an overview of a system allowing a user to view missed content, in accordance with some examples of the disclosure.

FIG. 1 illustrates an overview of a system 100 configured to allow a user 102 to view a missed portion of media content, e.g., as a result of connectivity issues when viewing a live content stream, in accordance with some examples of the disclosure. In some examples, system 100 includes a device 104, such as a tablet computer, a smartphone, a smart television, a smart speaker, or the like, that has one or more various user interfaces, e.g., remote control 114, configured to allow one or more nearby users to interact with device 104. In some examples, device 104 has a display 106, which is configured to display live media content transmitted from a service provider and/or information via a graphical user interface. The graphical user interface may be configured to provide one or more user-selectable options, which allow user 102 to navigate the live content stream and/or view missed portions of the live content stream. System 100 may also include communications network 108, such as the Internet. System 100 may also include one or more servers 110 and/or one or more content databases 112 from which live and/or recorded programming may be transmitted to user device 104. Device 104 and server 110 may be communicatively coupled to one another by way of network 108, and server 110 may be communicatively coupled to content database 112 by way of one or more communication paths, such as a proprietary communication path and/or network 108.

In some examples, system 100 may comprise an application that provides guidance through an interface, e.g., the graphical user interface, that allows users to efficiently navigate media content selections and easily identify media content that they may desire, such as content on one or more live streams. Such guidance is referred to herein as an interactive content guidance application or, sometimes, a content guidance application, a media guidance application, or a guidance application.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
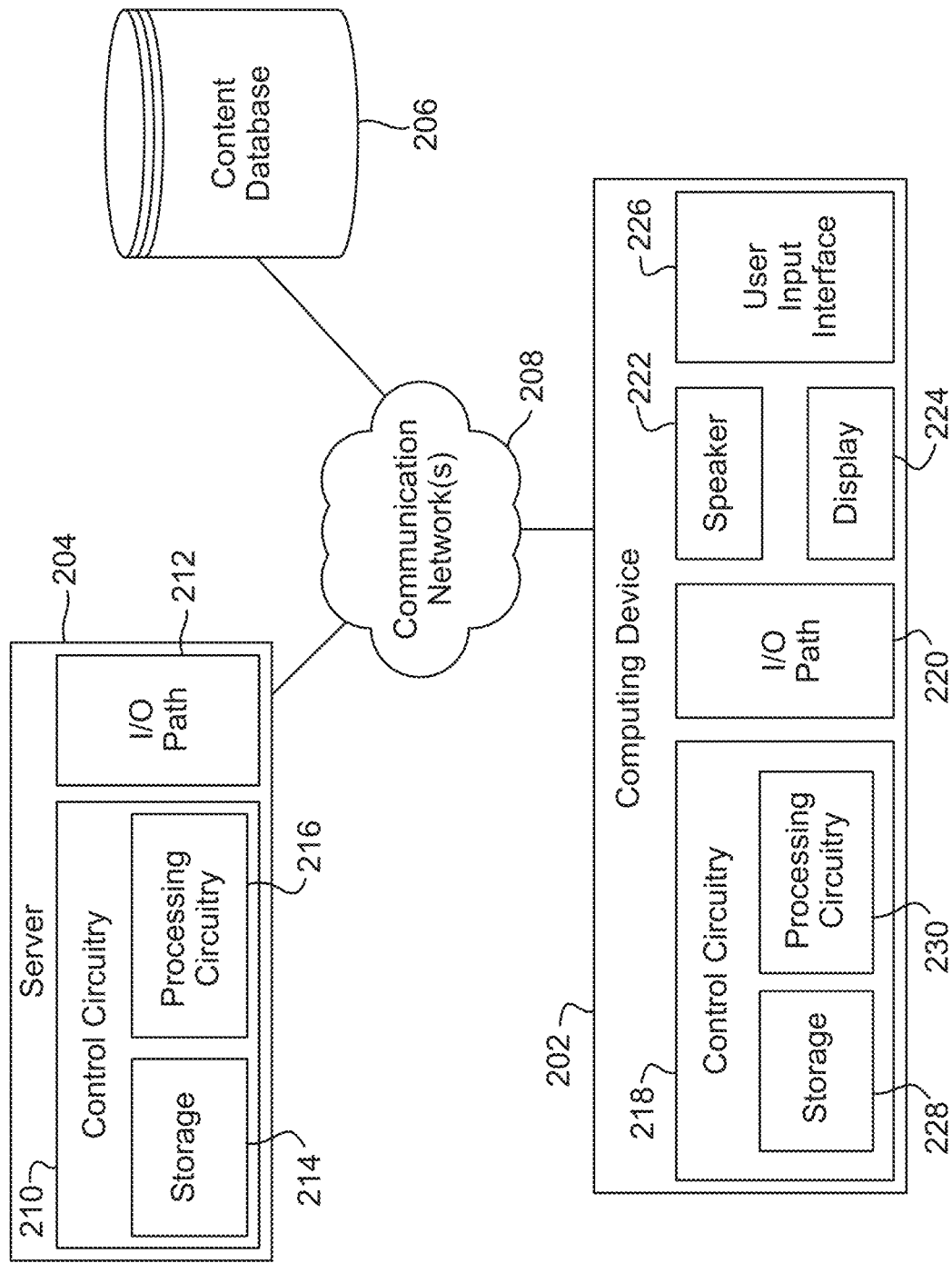
FIG. 2 is a block diagram showing components of an exemplary system allowing a user to view missed content, in accordance with some examples of the disclosure.

FIG. 2 is an illustrative block diagram showing additional details of an example of system 200 configured to allow a user 102 to view a missed portion of media content, e.g., as a result of connectivity issues when viewing a live content stream, in accordance with some examples of the disclosure. Although FIG. 2 shows system 200 as including a number and configuration of individual components, in some examples, any number of the components of system 200 may be combined and/or integrated as one device, e.g., user device 104. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, e.g., touchscreen 102, and user input interface 226, which in some examples includes at least one of a voice-user interface configured to receive natural language queries uttered by users in proximity to computing device 202; and a touch/gesture interface configured to receive a touch/gesture input, e.g., a swipe. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions to control circuitry 210 and/or 218 using user input interface 226. User input interface 226 may be any suitable user interface, such as a remote control (e.g., remote control 114), trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
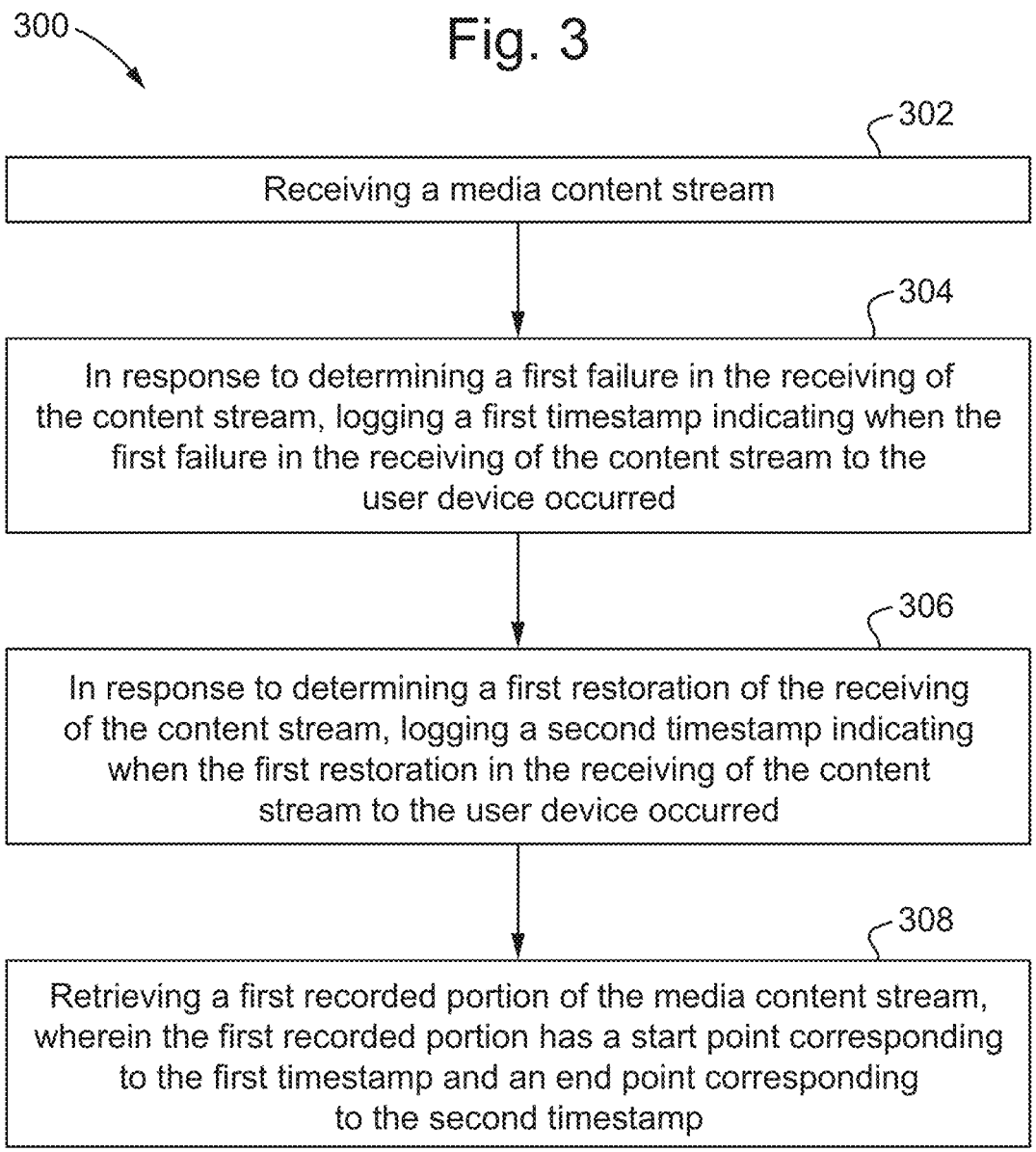
FIG. 3 is a flowchart representing a process for retrieving a missed portion of media content, in accordance with some examples of the disclosure.
Figure 4:
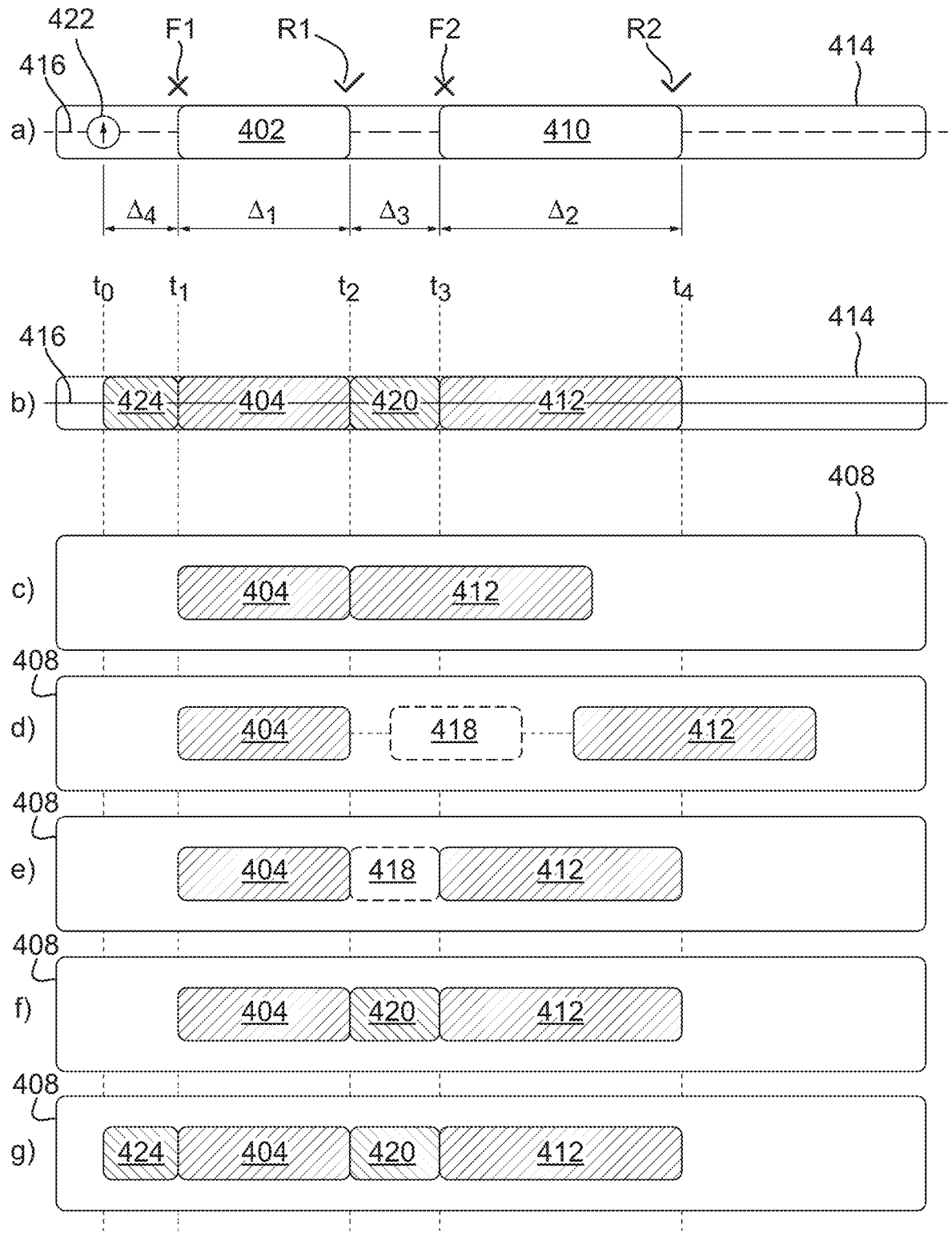
FIG. 4 is a diagrammatic representation showing various options for determining, retrieving and/or storing one or more missed portions of media content, in accordance with some examples of the disclosure.

FIG. 3 is a flowchart representing an illustrative process 300 for retrieving media content corresponding to a missed portion of content from a live stream, in accordance with some examples of the disclosure. FIG. 4 is a diagrammatic representation showing various options for determining, retrieving and/or storing one or more missed portions of media content, e.g., FIG. 4a illustrates determining missed portions of a live media stream, FIG. 4b illustrates retrieving missed portions from a recording of the live media stream of FIG. 4a. FIGS. 4-g illustrate various ways of storing missed portions of a live media stream. Process 300 is described below with reference to FIG. 1 and FIG. 4. While the example shown in FIG. 3 refers to the use of system 100, as shown in FIG. 1, it will be appreciated that the illustrative process shown in FIG. 3, and any of the other following illustrative processes, may be implemented on system 100 and system 200, either alone or in combination, or on any other appropriately configured system architecture.

At step 302, user device 104 receives a live media content stream (represented in FIG. 1 as dotted line 116 and in FIG. 4a as dotted line 416). In the example shown in FIG. 1, live media content stream 116 is received at user device 104 directly via network 108. However, in one or more other examples, live media content stream 116 may be received indirectly, e.g., via network 108 in combination with one or more local networks or network hubs (not shown). In some examples, the live media content stream 116 may be a live sporting event, such as a football match, or a live news feed.

Process 300 may comprise a step of monitoring, e.g., using control circuitry of the user device 104, the state of the connection between the user device 104 and the network 108. For example, user device 104 may be configured to monitor the bandwidth of the connection to network 108, e.g., as the live media content stream 116 is being received. In some examples, a failure and/or a restoration in the connection between the user device 104 and the network 108 may be determined. In the context of the present disclosure, the term "failure," when applied to a network connection, is understood to mean (i) a complete breakdown, e.g., where no data can be transferred to the user device 104 (e.g., for a predetermined amount of time), (ii) a drop in bandwidth below a threshold value (e.g., for a predetermined amount of time), or (iii) a combination of the two. In some examples, a failure may be said to occur when there are multiple occurrences (e.g., 2 occurrences or 10 occurrences) of at least one of a complete breakdown and drop in bandwidth below a threshold value within a predetermined amount of time. For example, a failure in the connection between the user device 104 and the network 108 may be determined upon the connection intermittently breaking down completely and/or the bandwidth intermittently dropping below a threshold value over a certain period (e.g., 10 seconds, 1 minute or 10 minutes). In the context of the present disclosure, the term "restoration," when applied to a network connection, is understood to mean an at least partial restoration of the network connection following a failure. In some examples, the device 104 and/or control circuitry 218 may be configured to log the state of the connection between the user device 104 and the network 108 so that one or more failures and/or restorations may be determined, e.g., independently from any data provided via network 108, and/or from server 110 and/or content database 112, or any other appropriate device. In the example shown in FIG. 1, a first failure is indicated by icon F1. The representation shown in FIG. 4 shows first failure F1, second failure F2, first restoration R1 and second restoration R2, which are described below in more detail.

At step 304, in response to determining, e.g., detecting, the first failure F1 in the receiving of the content stream 116, control circuitry of user device 104 logs a first timestamp t1 indicating when the first failure F1 in the receiving of the content stream 116 at the user device 104 occurred. Timestamp t1 may be stored in a database on user device 104. For example, control circuitry of user device 104 may cause timestamp t1 to be stored in storage of user device 104. In some examples of failures, such as complete breakdown of connection or very low bandwidth, it will be appreciated that user device 104 may not be able to communicate the failure in connection to server 110 and/or content database 112.

At step 306, in response to determining the first restoration R1 in the receiving of the content stream 116, control circuitry of user device 104 logs a second timestamp t2 indicating when the first restoration R1 in the receiving of the content stream 116 to the user device 104 occurred. Timestamp t2 may be stored in a database on user device 104. For example, control circuitry of user device 104 may cause timestamp t2 to be stored in storage of user device 104. In some examples, control circuitry of the user device 104 may be configured to process the logged timestamps t1 and t2 to determine a period $\Delta 1$ between the first timestamp t1 and the second timestamp t2, e.g., the length of time between the logged failure and the logged restoration of connection. In this manner, timestamps t1 and t2, and thus period $\Delta 1$, define the length of a first missed portion 402 of the live media content stream 116 that a viewer was not able to watch as a result of poor connectivity to the service provider.

In some examples, once the connection to network 108 has been restored, e.g., to a sufficient level, user device 104 may communicate a failure in the connection with server 110 and/or content database 112. For example, user device 104 may communicate, via network 108, timestamps t1 and t2, and/or period $\Delta 1$, with server 110 to indicate to the server that a portion of the live media content stream 116, 416 has been missed by the user. In some examples, processing of timestamp data, e.g., timestamp t1, timestamp t2, and/or any other timestamp, may be carried out on user device 104 and/or on server 110.

At step 308, control circuitry of user device 104 causes a first recorded portion 404 of the live media content stream 116, 416 to be retrieved. For example, server 110 and/or content database 112 may store a recording of the live media content stream 116, 416. The recording of the live media content stream 116 (hereinafter referred to as the recorded media stream) is shown as line 406 in FIG. 4b. In the example shown in FIG. 4, the first recorded portion 404 has a start point corresponding to the first timestamp t1 and an end point corresponding to the second timestamp t2, and thus its duration is defined by period $\Delta 1$. In this manner, by virtue of the communication of timestamp t1 and timestamp t2 from user device 104, server 110 and/or content database 112 are able to retrieve first recorded portion 404, which corresponds to the first missed portion 402 of the live media content stream 116, 416.

In some examples, first recorded portion 404 may be stored for later access by the user. For example, first recorded portion 404 may be stored on server 110 and/or in content database 112, e.g., at a user profile level, so that the user can access the content at a convenient time, e.g., via network 108. Additionally or alternatively, first recorded portion 404 may be transmitted to user device 104 and stored locally, e.g., on storage of user device 104. In some examples, it may be advantageous to transmit first recorded portion 404 so that user can view the first recorded portion 404 even upon a subsequent failure in the network connection. In the example shown in FIG. 1, user device 104 displays a user-selectable option 118 that allows the user to view first recorded portion 404, either from server 110 or from local storage on user device 104. In some examples, server 110 provides an API to user device 104, the API being configured to provide a link to first recorded portion 404, wherever it may be stored. In some examples, the link may cause automatic playback of the first recorded portion 404. Additionally or alternatively, server 110 may provide an API to one or more other user devices, such as a smartphone or tablet, so that the user can view the missed portion while away from user device 104.

In the example shown in FIG. 1, upon user selection, first recorded portion 404 is displayed on user device 104, e.g., as a picture-in-picture display 120. In this manner, user 102 is able to catch up on the portion of missed content while the live media content stream 116 continues to be shown on user device 104. Additionally or alternatively, first recorded portion 404 may be generated for display on another device, such as a smartphone of the user. In some examples, first recorded portion 404 may be automatically generated for display, e.g., without any user input. For example, first recorded portion 404 may automatically be generated for display, e.g., on user device 104, upon retrieval of first recorded portion 404 and transmittal to user device 104. In this manner, user 102 is automatically presented with a portion of missed content of a live media content stream 116, 416, as the live media content stream 116, 416 continues to be displayed, ensuring that user 102 is fully aware of all progress of whatever program they are viewing on the live media content stream 116, 416, despite any connectivity issues that might exist.

The actions or descriptions of FIG. 3 may be used with any other example of this disclosure, e.g., the example described below in relation to any of FIGS. 5-6. In addition, the actions and descriptions described in relation to FIG. 3 may be done in any suitable alternative orders or in parallel to any of the processes shown in FIGS. 5-6 to further the purposes of this disclosure.

FIG. 5 is a flowchart representing an illustrative process 500 for optimizing the storage of missed content, in accordance with some examples of the disclosure. Process 500 is described below with reference to FIG. 1 and FIG. 4. While the example shown in FIG. 5 refers to the use of system 100, as shown in FIG. 1, it will be appreciated that the illustrative process shown in FIG. 5, and any of the other following illustrative processes, may be implemented on system 100 and system 200, either alone or in combination, or on any other appropriately configured system architecture.

At step 502, the period $\Delta 1$ between the first timestamp t1 and the second timestamp t2 is determined as described above. Such determination may be carried out on at least one of user device 104 and server 110.

At step 504, period $\Delta 1$ is compared to a first threshold period $\Delta THRESHOLD1$, which may be stored on at least one of user device 104 and server 110. The value for $\Delta_{THRESHOLD1}$ may be set at any appropriate value, e.g., 5 seconds, or 1 minute. In some examples, $\Delta_{THRESHOLD1}$ may be set a value corresponding to a minimum duration of missed content that a user would want to view. For example, a user may be interested in viewing a portion of missed content having a duration sufficient to drawing meaning from, such a duration over 10 seconds or 30 seconds, e.g., depending on one or more settings in a user profile, or the type of content being transmitted on the live media content stream 116, 416. In some examples, a user may have no interest in viewing a missed portion of content having a duration less than a certain value, such as 5 seconds or 1 second, since viewing such a small portion of content would be confusing.

In some examples, a value for $\Delta_{THRESHOLD1}$ may be selected by a user and stored in a user profile. Additionally or alternatively, a value for $\Delta_{THRESHOLD1}$ may be automatically set by user device 104, e.g., in response to monitoring the state of the connection between user device 104 and server 110. Additionally or alternatively, a value for $\Delta_{THRESHOLD1}$ may be selected by a service provider, e.g., based on one or more operational parameters of network 108 and/or server 110, such as the maximum bandwidth available on network 108, the quality of the live media content stream 116, 416, and/or the type of content being transmitted on the live media content stream 116, 416.

At step 506, in response to determining that the period $\Delta 1$ between the first timestamp t1 and the second timestamp t2 is greater than the first threshold period $\Delta_{THRESHOLD1}$, control circuitry of user device 104 causes storage of the first recorded portion 404 of the media content stream, in a manner similar to that described above. FIGS. 4c-4g illustrate storage of the first recorded portion 404 in storage 408, which may be any appropriate storage module as described herein. Where period $\Delta 1$ between the first timestamp t1 and the second timestamp t2 is less than the first threshold period $\Delta_{THRESHOLD1}$, the first recorded portion 404 is not stored. In this manner, storage of missed portions of the live media content stream 116, 416 can be managed efficiently, since missed portions that are of no interest to the user, and/or from which the user can derive no meaning, are not stored. Although described in the context of process 500, in some examples, period $\Delta 1$ may be compared to the first threshold period $\Delta_{THRESHOLD1}$ before the first recorded portion 404 is retrieved, e.g., before step 308 of process 300. In such an example, process 300 may terminate before the retrieval of the first recorded portion 404, which may reduce the operational demand placed on at least one of user device 104, network 108 and server 110.

The actions or descriptions of FIG. 5 may be used with any other example of this disclosure. In addition, the actions and descriptions described in relation to FIG. 5 may be done in any suitable alternative orders or in parallel to further the purposes of this disclosure.

FIGS. 6-8 show a flowchart representing an illustrative process 600 for stitching together multiple portions of missed content, in accordance with some examples of the disclosure. Process 600 is described below with reference to FIG. 1 and FIG. 4. While the example shown in FIGS. 6-8 refers to the use of system 100, as shown in FIG. 1, it will be appreciated that the illustrative process shown in FIGS. 6-8, and any of the other following illustrative processes, may be implemented on system 100 and system 200, either alone or in combination, or on any other appropriately configured system architecture.

Process 600 comprises step 602, which is carried out in a manner similar to step 302 of process 300.

Process 600 may comprise a step of monitoring the state of the connection between the user device 104 and the network 108, in a manner similar to that of process 300.

Process 600 comprises step 604, which is carried out in a manner similar to step 304 of process 300.

Process 600 comprises step 606, which is carried out in a manner similar to step 306 of process 300.

Process 600 comprises step 608, which is carried out in a manner similar to step 308 of process 300.

At step 610, in response to determining a second failure F2 in the receiving of the live media content stream 116, 416, control circuitry of user device 104 logs a third timestamp t3 indicating when the second failure F2 in the receiving of the live media content stream 116, 416 to the user device 104 occurred. Timestamp t3 may be stored in a database on user device 104. For example, control circuitry of user device 104 may cause timestamp t3 to be stored in storage of user device 104. In some examples of failures, such as complete breakdown of connection or very low bandwidth, it will be appreciated that user device 104 may not be able to communicate the failure in connection to server 110 and/or content database 112, and thus timestamp t3 may not be able to be communicated to server 110, e.g., until the connection is sufficiently restored.

At step 612, in response to determining a second restoration R2 in the receiving of the content stream 116, 416, control circuitry of user device 104 logs a fourth timestamp t4 indicating when the second restoration R2 in the receiving of the content stream 116 to the user device 104 occurred. Timestamp t4 may be stored in a database on user device 104. For example, control circuitry of user device 104 may cause timestamp t4 to be stored in storage of user device 104. In some examples, control circuitry of the user device 104 may be configured to process the logged timestamps t3 and t4 to determine a period $\Delta 2$ between the third timestamp t3 and the fourth timestamp t4, e.g., the length of time between the logged failure and the logged restoration of connection. In this manner, timestamps t3 and t4, and thus period $\Delta 2$, define the length of a second missed portion 410 of the live media content stream 116, 416 that a viewer was not able to watch.

In some examples, once the connection to network 108 has been restored, e.g., to a sufficient level, user device 104 may communicate a failure in the connection with server 110 and/or content database 112. For example, user device 104 may communicate, via network 108, timestamps t3 and t4, and/or period $\Delta 2$, with server 110 to indicate to the server that a portion of the live media content stream 116, 416 has been missed by the user. In some examples, processing of timestamp data, e.g., timestamp t3, timestamp t4, and/or any other timestamp, may be carried out on user device 104 and/or on server 110.

At step 614, control circuitry of user device 104 causes a second recorded portion 412 of the live media content stream 116, 416 to be retrieved, e.g., from the recorded media stream 406, or another recording of the live media content stream 116. In the example shown in FIG. 4, the second recorded portion 412 has a start point corresponding to the third timestamp t3 and an end point corresponding to the fourth timestamp t4, and thus its duration is defined by period $\Delta 2$. In this manner, by virtue of the communication of timestamp t3 and timestamp t4 from user device 104, server 110 and/or content database 112 are able to retrieve second recorded portion 412, which corresponds to the second missed portion 410 of the live media content stream 116, 416.

At step 616, control circuitry of user device 104 determines if the first recorded portion 404 and the second recorded portion 412 are each a portion of the same media content item of the live media content stream 116, 416. For example, the live media content stream 116, 416 and/or the recorded stream 406 may comprise metadata containing information describing the content being transmitted/recorded. Where the metadata is indicative that the first recorded portion 404 and the second recorded portion 412 each have at least a portion belonging to the same program, e.g., the same football match or the same news report, process 600 moves to step 618. Where the metadata is indicative that the first recorded portion 404 and the second recorded portion 412 do not have at least a portion belonging to the same program, e.g., the same football match or the same news report, control circuitry of the user device 104 causes each of the first recorded portion 404 and the second recorded portion 412 to be stored, e.g., separately, for later access by the user, as described above.

At step 618, in response determining that the first recorded portion 404 and the second recorded portion 412 each belong to the same media content item 414 of the live media content stream 116, 416 or the recorded stream 406, control circuitry of user device 104 causes the second recorded portion 412 to be stitched to the first recorded portion 404. In the context of the present application, the term "stitch," when applied to media content, means to combine or join such that the media files can be played and navigated through as a single media file. For example, FIG. 4c illustrates the beginning of the second recorded portion 412 stitched directly to the end of the first recorded portion 404. However, in some examples, second recorded portion 412 need not be stitched directly to the end of the first recorded portion 404, just combined so that they play as a single file. For example, the second recorded portion 412 may be stitched to but spaced apart from the first recorded portion 404, such that there is a delay in playback between the end of the first recorded portion 404 and the start of the second recorded portion 412. The combined recorded portion 404-412 may then be stored, e.g., in storage 408, for later access by the user. Stitching of portions is beneficial as it increases the efficiency of a user catching up on missed portions of the live media content stream 116, 416, since a single instruction may be made to play back multiple missed portions in one go. In some examples, remote control 114 may comprise a button configured for quick-access playback of any recorded media portions that have been stitched together and stored for user access.

In some examples, such as those shown in FIGS. 4d and 4e process 600 may comprise stitching one or more additional portions 418 of media content that do not form part of the live media content stream 116, 416 to at least one of the first recorded portion 404 and the second recorded portion 412. The additional portion 418 of media content may comprise content determined relevant to the user, e.g., by virtue of one or more settings in a user profile, such as a trailer for a program of a user's preferred genre. Additionally or alternatively, the additional portion 418 of media content may comprise a commercial.

In some examples, the additional portion 418 may comprise media content to aid the transition between the first recorded portion 404 and the second recorded portion 412. For example, the additional portion 418 may comprise a summary of the content of the live media content stream 116, 416 for the time that has elapsed between timestamps, e.g., between timestamp t2 and timestamp t3. In this manner, where the first recorded portion 404 and the second recorded portion 412 are from disparate portions of program 414, additional portion 418 can add context to the transition between the first recorded portion 404 and the second recorded portion 412, as the user views the missed portions.

In the example shown in FIG. 4d, additional content 418 has been stitched to and spaced apart from the end of the first recorded portion 404, and stitched to and spaced apart from the beginning of the second recorded portion 412. In the example shown in FIG. 4e, additional content 418 has been stitched directly to the end of the first recorded portion 404 and the beginning of the second recorded portion 412. However, the additional content 418 may be stitched to at least one of the first recorded portion 404 and the second recorded portion 412 in any appropriate manner.

At step 620, control circuitry of the user device 104 determines the period Δ3 between the second timestamp t2 and the third timestamp t3, in a manner similar to that described above. Period 43 is compared to a second threshold period $\Delta_{THRESHOLD2}$, which may be stored on at least one of user device 104 and server 110. The value for $\Delta_{THRESHOLD2}$ may be set at any appropriate value, e.g., 5 seconds, or 1 minute. In some examples, $\Delta_{THRESHOLD2}$ may be set a value corresponding to a minimum duration of missed content that a user would want to view. For example, a user may be interested in viewing a portion of missed content in between the first missed portion 402 of the live media content stream 116, 416 and the second missed portion 410 of the live media content stream 116, 416. This may be beneficial where the first missed portion 402 and the second missed portion 410 are closely spaced. For example, the second missed portion 410 may have occurred only a short time after the first portion, e.g., 2 seconds or 10 seconds after the first missed portion 402. In such a case, it may be more desirable for a user to view the portion of content that joins the first missed portion 402 and the second missed portion 410 when catching up on missed content, e.g., to avoid the display of the missed content skipping or jumping from portion to portion. Such as feature is beneficial as it adds context when viewing missed portions of content, and in some cases it may place lower operational demand on the user device 104 and/or the server 110.

In some examples, a value for $\Delta_{THRESHOLD2}$ may be selected by a user and stored in a user profile. Additionally or alternatively, a value for $\Delta_{THRESHOLD2}$ may be automatically set by user device 104, e.g., in response to monitoring the state of the connection between user device 104 and server 110. Additionally or alternatively, a value for $\Delta_{THRESHOLD2}$ may be selected by a service provider, e.g., based on one or more operational parameters of network 108 and/or server 110, such as the maximum bandwidth available on network 108, the quality of the live media content stream 116, 416, and/or the type of content being transmitted on the live media content stream 116, 416.

At step 622, in response to determining that the period Δ3 between the second timestamp t2 and the third timestamp t3 is less than the second threshold period $\Delta_{THRESHOLD2}$, control circuitry of user device 104 causes retrieval of a third recorded portion 420 of the media content stream, wherein the third recorded portion 420 has a start point corresponding to the second timestamp t2 and an end point corresponding to the third timestamp t3. Third recorded portion 420 corresponds to a portion of the live media content stream 116, 416 that the user has not missed, since there was no failure in connection to network 108 between the second timestamp t2 and the third timestamp t3. Additionally, control circuitry of user device 104 may cause storage of the third recorded portion 420 of the media content stream 406, in a manner similar to that described above for the first and second recorded portions 404, 412, in response to determining that the period Δ3 between the second timestamp t2 and the third timestamp t3 is less than the second threshold period $\Delta_{THRESHOLD2}$. FIGS. 4f and 4g illustrate storage of the third recorded portion 420 in storage 408, which may be any appropriate storage module as described herein. In situations where period Δ3 between the second timestamp t2 and the third timestamp t3 is greater than the second threshold period $\Delta_{THRESHOLD2}$, the third recorded portion 420 may not be stored. In this manner, storage of already-viewed portions of the live media content stream 116, 416 can be managed efficiently. Although described in the context of process 600, in some examples, period Δ3 may be compared to the second threshold period $\Delta_{THRESHOLD2}$ before the third recorded portion 420 is retrieved. In such an example, process 600 may result in the stitching of the first recorded portion 404 to the second recorded portion 412 in the manner described above.

At step 624, control circuitry of the user device 104 causes the third recorded portion 420 to be stitched in between the first recorded portion 404 and the second recorded portion 412. FIGS. 4f and 4g illustrate the stitching of the beginning of the third recorded portion 420 directly to the end of the first recorded portion 404, and the end of the third recorded portion 420 to the beginning of the second recorded portion 412. In this manner, a combined portion of missed media content 404-420-412 is available for viewing by the user. The benefit of providing such a combined portion is that a single portion of media content may be stored, said single portion being continuously viewable from a point in the live media content stream 116, 416 corresponding to the first failure F1 to a point in the live media content stream 116, 416 corresponding to the second restoration R2.

At step 626, control circuitry of the user device 104 determines a period Δ4 between the first timestamp t1 and an adjacent, e.g., preceding or succeeding, segment marker 422 in the live media content stream 116, 416. Segment marker 422 may comprise metadata indicating the start of a new segment in the live media content stream 116, 416. For example, it is common for a service provider to insert segment markers into a content stream as reference for use in subsequent operations, such as retrieval of recorded portions of the content stream. Segment markers may be placed, typically, at six-second intervals throughout the media stream. Additionally or alternatively, a service provider may insert a segment marker, e.g., manually, as the live media content stream 116, 416 is transmitted, and/or in the recorded media stream 406 after the content stream has been transmitted. A segment marker may be inserted in a live/recorded content stream to mark the start of a key event in the live stream. For example, where the live stream is a football match, a marker may be inserted to mark the start of a goal, or the start of a portion of play that resulted in the goal.

At step 628, period Δ4 is compared to a third threshold period $\Delta_{THRESHOLD3}$, which may be stored on at least one of user device 104 and server 110. The value for $\Delta_{THRESHOLD3}$ may be set at any appropriate value, e.g., 5 seconds, or 1 minute. In some examples, $\Delta_{THRESHOLD3}$ may be set a value corresponding to a minimum duration of missed content that a user would want to view. For example, a user may be interested in viewing a portion of missed content that preceded the first missed portion 402 of the live media content stream 116, 416. This may be beneficial where failure F1 occurs partway through a segment of the live media content stream 116, 416. For example, failure F1 may occur partway through an exciting period of play of a football match, or in the middle of a heated debate in a news report. In such situations, it may be desirable to provide the user with a portion of recorded media content that preceded a failure, e.g., so that the user can watch the buildup to a missed portion of content.

In some examples, a value for $\Delta_{THRESHOLD3}$ may be selected by a user and stored in a user profile. Additionally or alternatively, a value for $\Delta_{THRESHOLD3}$ may be automatically set by user device 104, e.g., in response to monitoring the state of the connection between user device 104 and server 110. Additionally or alternatively, a value for $\Delta_{THRESHOLD3}$ may be selected by a service provider, e.g., based on one or more operational parameters of network 108 and/or server 110, such as the maximum bandwidth available on network 108, the quality of the live media content stream 116, 416, and/or the type of content being transmitted on the live media content stream 116, 416. In some examples, $\Delta_{THRESHOLD3}$ may be set based on the spacing of segment markers contained within the stream. For example, where segment markers are place at six-second intervals throughout the stream, $\Delta_{THRESHOLD3}$ may be set at a minimum of 6 seconds.

At step 622, in response to determining that the period Δ4 between the first timestamp t1 and segment marker 422 is less than the third threshold period $\Delta_{THRESHOLD3}$, control circuitry of user device 104 causes retrieval of a fourth recorded portion 424 of the media content stream, wherein the fourth recorded portion 424 has a start point corresponding to segment marker 422 and an end point corresponding to the first timestamp t1. Fourth recorded portion 424 corresponds to a portion of the live media content stream 116, 416 that the user has not missed, since there was no failure in connection to network 108 in the period leading up to the first failure F1. Additionally, control circuitry of user device 104 may cause storage of the fourth recorded portion 424 of the media content stream 406, in a manner similar to that described above for the first, second and third recorded portions 404, 412, 420, in response to determining that the period Δ4 between the first timestamp t1 and the segment marker is less than the third threshold period $\Delta_{THRESHOLD3}$. FIG. 4g illustrates storage of the fourth recorded portion 424 in storage 408, which may be any appropriate storage module as described herein. In situations where period Δ4 between the first timestamp t1 and the segment marker is greater than the third threshold period $\Delta_{THRESHOLD3}$, the fourth recorded portion 424 may not be stored. In this manner, storage of already-viewed portions of the live media content stream 116, 416 can be managed efficiently. Although described in the context of process 600, in some examples, period Δ4 may be compared to the third threshold period $\Delta_{THRESHOLD3}$ before the fourth recorded portion 424 is retrieved. In such an example, process 600 may result in no preceding portions being made available for viewing by the user.

At step 630, control circuitry of the user device 104 causes the fourth recorded portion 424 to be stitched in front of the first recorded portion 404. FIG. 4g illustrates the stitching of the end of the fourth recorded portion 424 directly to the beginning of the first recorded portion 404. In this manner, a combined portion of missed media content 424-404-420-412 is available for viewing by the user. The benefit of providing such a combined portion is that a single portion of media content may be stored, said single portion being continuously viewable from a point in the live media content stream 116, 416 corresponding to a time before the first failure F1 to a point in the live media content stream 116, 416 corresponding to the second restoration R2. In this manner, the user is able to view a complete portion of media content in which context has been added to the missed portions 404, 412 by retrieving at least one further portion that the user has already viewed and stitching it to at least one portion of missed content, to account for the leadup to a period of one or more failures and/or the period in between successive failures in the receiving of the live media content stream 116, 416.

In a similar manner to that described in relation to process 300, at least one of the first, second, third and fourth recorded portions 404, 412, 420, 424, additional portion 418, and/or any combined portion (hereinafter referred to as auto-recorded content), may be stored for later access by the user. For example, recorded, additional and/or combined portions of content may be stored on server 110 and/or on content database 112, e.g., at a user profile level, so that the user can access the content at a convenient time, e.g., via network 108. Additionally or alternatively, auto-recorded content may be transmitted to user device 104 and stored locally, e.g., on storage of user device 104. In some examples, it may be advantageous to transmit, e.g., to user device 104, auto-recorded content so that user can view auto-recorded content even upon a subsequent failure in the network connection. In some examples, server 110 provides an API to user device 104, the API being configured to provide a link to auto-recorded content, wherever it may be stored. In some examples, the link may cause automatic playback of auto-recorded content. In some examples, server 110 may compile a manifest of one or more recorded, additional and/or combined portions of content that form the auto-recorded content. The manifest may include metadata describing, respectively, one or more of the recorded, additional and/or combined portions of content. For example, the metadata may describe one or more characteristics of one or more of the portions forming the auto-recorded content, such a timestamp (t0, t1, t2, . . . , tn), duration (Δ1, Δ2, Δ3, . . . , Δn), Iframe detail, a summary of the content of each of the portions, hash tag data, and/or any other appropriate characteristic of the content. In some examples, user device 104 may parse the manifest stored in server 110 to compile another manifest of one or more recorded, additional and/or combined portions of content that form the auto-recorded content. In this manner, user device 104 may navigate auto-recorded content to which it is given access, e.g., on server 110, and/or which has been transmitted to and/or stored on user device 104. For example, user device 104 may be configured to display a list of portions forming the auto-recorded content along with respective Iframes, which allows a user to efficiently navigate through the auto-recorded content. Additionally or alternatively, the user may skip forwards and/or backwards through the auto-recorded content, so more easily find a missed portion of interest. Additionally or alternatively, user device 014 may be configured to display a progress bar indicating a total duration of the auto-recorded content. In some examples, each the portions of content forming the auto-recorded content may be color-coded to allow for more efficient navigation. For example, each the portions of content forming the auto-recorded content may be color-coded by their type, e.g., a missed portion of content, (such as first missed portion 404, second missed portion 412, and subsequent missed portions) may receive a first color code, additional content (such as additional content 420) may receive a second color code, and another recorded, but not missed, portion (such as recorded portions 420, 424) may receive a third color code. In this manner, the user is able to discern between portion that the actually missed and any content that has been added to add context to the auto-recorded content. In some examples, metadata describing one or more characteristics of one or more of the portions forming the auto-recorded content may comprise data related to one or more portions of missed content that contain an important event, such as a goal in a football game, or an important news announcement. For example, a portion of auto-recorded content containing an important event may be color-coded, additionally or alternatively, with a fourth color, and/or otherwise marked appropriately. In this manner, a user can navigate efficiently through the auto-recorded content to those portions that contain key events. In some examples, user device 104 may provide the user with an option to skip to the next portion of content in the auto-recorded content containing an important event.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for viewing missed media content comprising:

receiving, via a communication path, a media content stream at a user device, wherein the media content stream transmits content of a media content item to the user device;

in response to determining a first failure in the receiving of the media content stream via the communication path, logging a first timestamp indicating when the first failure in the receiving of the media content stream at the user device occurred;

in response to determining a first restoration of the receiving of the media content stream at the user device via the communication path, logging a second timestamp indicating when the first restoration in the receiving of the media content stream at the user device occurred;

identifying a first recorded portion of the media content stream having a start point corresponding to the first timestamp and an end point corresponding to the second timestamp;

accessing metadata comprising information describing content of the media content item of the media content stream;

determining, based on the information describing the content, that the first recorded portion is a missed portion belonging to the media content item, wherein the missed portion failed to be transmitted by the media content stream to the user device between the first failure and the first restoration of the receiving of the media content stream;

in response to the determining, retrieving the first recorded portion of the media content stream; and stitching additional media content to the first recorded portion, wherein the additional media content is not part of the media content stream, wherein the stitching the additional media content to the first recorded portion comprises spacing apart the first recorded portion and the additional media content such that there is a perceivable delay between the first recorded portion and the additional media content during playback at the user device.

2. The method of claim 1, the method comprising:
determining the period between the first timestamp and the second timestamp; and
in response to determining that the period between the first timestamp and the second timestamp is greater than a first threshold period, storing, for user playback, the first recorded portion of the media content stream.

3. The method of claim 1, wherein the missed portion is a first missed portion, the method comprising:
in response to determining a second failure in the receiving of the content stream, logging a third timestamp indicating when the second failure in the receiving of the content stream to the user device occurred;
in response to determining a second restoration of the receiving of the content stream, logging a fourth timestamp indicating when the second restoration in the receiving of the content stream to the user device occurred;
retrieving a second recorded portion of the media content stream, wherein the second recorded portion has a start point corresponding to the third timestamp and an end point corresponding to the fourth timestamp;
determining if the second recorded portion is a second missed portion belonging to the same media content item as the first recorded portion; and
in response to determining that the first recorded portion and the second recorded portion belong to the same media content item of the media content stream, stitching the second recorded portion to the first recorded portion.

4. The method of claim 3, the method comprising:
determining the period between the second timestamp and the third timestamp;
in response to determining that the period between the second timestamp and the third timestamp is less than a second threshold period, retrieving a third recorded portion of the media content stream, wherein the third recorded portion has a start point corresponding to the second timestamp and an end point corresponding to the third timestamp; and
stitching the third recorded portion in between the first recorded portion and the second recorded portion.

5. The method of claim 1, the method comprising:
determining a period between the first timestamp and an adjacent segment marker in the media content stream; and
in response to determining that the period between the first timestamp and the adjacent segment marker in the media content stream is less than a third threshold period, retrieving a fourth recorded portion of the media content stream, wherein the fourth recorded portion has a start point corresponding to the segment marker and an end point corresponding to the first timestamp; and
stitching the fourth recorded portion to the first recorded portion.

6. The method of claim 1, the method comprising generating for playback at least one recorded portion of the media content stream.

7. The method of claim 1, the method comprising selecting for playback at least one recorded portion of the media content stream.

8. The method of claim 1, the method comprising monitoring, at the user device, the state of a connection between the user device and a network over which the media content stream is received.

9. A system for viewing missed media content, the system comprising:
a communication path configured to provide media content to a user device; and
control circuitry configured to:
receive, via the communication path, a media content stream at the user device, wherein the media content stream transmits content of a media content item to the user device;
in response to determining a first failure in the receiving of the media content stream via the communication path, log a first timestamp indicating when the first failure in the receiving of the media content stream at the user device occurred;
in response to determining a first restoration of the receiving of the media content stream at the user device via the communication path, log a second timestamp indicating when the first restoration in the receiving of the media content stream at the user device occurred;
identify a first recorded portion of the media content stream having a start point corresponding to the first timestamp and an end point corresponding to the second timestamp;
access metadata comprising information describing content of the media content item;
determine, based on the information describing the content, that the first recorded portion is a missed portion belonging to the media content item, wherein the missed portion failed to be transmitted by the media content stream to the user device between the first failure and the first restoration of the receiving of the media content stream;
in response to determining that the first recorded portion is the missed portion, retrieve the first recorded portion of the media content stream; and
stitch additional media content to the first recorded portion, wherein the additional media content is not part of the media content stream, and wherein the control circuitry is configured to space apart the first recorded portion and the additional media content such that there is a perceivable delay between the first recorded portion and the additional media content during playback at the user device.

10. The system of claim 9, wherein the control circuitry is configured to:
determine the period between the first timestamp and the second timestamp; and
in response to determining that the period between the first timestamp and the second timestamp is greater than a first threshold period, store, for user playback, the first recorded portion of the media content stream.

11. The system of claim 9, wherein the missed portion is a first missed portion, and wherein the control circuitry is configured to:
in response to determining a second failure in the receiving of the content stream, log a third timestamp indicating when the second failure in the receiving of the content stream to the user device occurred;
in response to determining a second restoration of the receiving of the content stream, log a fourth timestamp indicating when the second restoration in the receiving of the content stream to the user device occurred;

retrieve a second recorded portion of the media content stream, wherein the second recorded portion has a start point corresponding to the third timestamp and an end point corresponding to the fourth timestamp;

determine if the second recorded portion is a second missed portion belonging to the same media content item as the first recorded portion; and in response to determining that the first recorded portion and the second recorded portion belong to the same media content item of the media content stream, stitch the second recorded portion to the first recorded portion.

12. The system of claim 11, wherein the control circuitry is configured to:

determine the period between the second timestamp and the third timestamp;

in response to determining that the period between the second timestamp and the third timestamp is less than a second threshold period, retrieve a third recorded portion of the media content stream, wherein the third recorded portion has a start point corresponding to the second timestamp and an end point corresponding to the third timestamp; and stitch the third recorded portion in between the first recorded portion and the second recorded portion.

13. The system of claim 9, wherein the control circuitry is configured to:

determine a period between the first timestamp and an adjacent segment marker in the media content stream; and in response to determining that the period between the first timestamp and the adjacent segment marker in the media content stream is less than a third threshold period, retrieve a fourth recorded portion of the media content stream, wherein the fourth recorded portion has a start point corresponding to the segment marker and an end point corresponding to the first timestamp; and stitch the fourth recorded portion to the first recorded portion.

14. The system of claim 9, wherein the control circuitry is configured to generate for playback at least one recorded portion of the media content stream.

15. The system of claim 9, wherein the control circuitry is configured to select for playback at least one recorded portion of the media content stream.

16. The system of claim 9, wherein the control circuitry is configured to monitor, at the user device, the state of a connection between the user device and a network over which the media content stream is received.

* * * * *